United States Patent [19]
Suzuki et al.

[11] Patent Number: 4,795,928
[45] Date of Patent: Jan. 3, 1989

[54] LINEAR ACTUATOR ASSEMBLY FOR ACCESSING A MAGNETIC MEMORY DISC

[75] Inventors: Masami Suzuki, Odawara; Hiroshi Nishida, Kanagawa; Jun Naruse; Tsuyoshi Takahashi, both of Odawara; Tomio Suzuki, Hiratsuka, all of Japan

[73] Assignee: Hitachi, Ltd., Tokyo, Japan

[21] Appl. No.: 8,324

[22] Filed: Jan. 29, 1987

[30] Foreign Application Priority Data

Jan. 29, 1986 [JP] Japan .................. 61-15651

[51] Int. Cl.⁴ .................................... H02K 41/02
[52] U.S. Cl. ................................ 310/13; 310/27
[58] Field of Search ............... 310/13, 27, 12; 360/97, 360/98, 99

[56] References Cited

U.S. PATENT DOCUMENTS

| | | | |
|---|---|---|---|
| 3,487,241 | 12/1969 | Carter | 310/13 |
| 3,624,896 | 12/1971 | Daubeney et al. | 310/13 X |
| 3,751,693 | 8/1973 | Gabor | 310/13 |
| 4,121,124 | 10/1978 | Hunt | 310/13 |
| 4,136,293 | 1/1979 | Patel | 310/13 |
| 4,144,466 | 3/1979 | Hatch | 310/27 |
| 4,220,878 | 9/1980 | Asano | 310/13 |
| 4,427,905 | 1/1984 | Sutton | 310/13 |

*Primary Examiner*—Patrick R. Salce
*Assistant Examiner*—D. L. Rebsch
*Attorney, Agent, or Firm*—Antonelli, Terry & Wands

[57] ABSTRACT

A linear actuator assembly for linearly the reciprocatingly moving magnetic heads in a magnetic disk storage apparatus. This linear actuator has a carriage for supporting magnetic heads, and a voice coil for moving the carriage. The sectional configurations of the carriage and the voice coil are equalized, thereby enabling the transmission of the driving force from the voice coil to the carriage without any eccentricity. This linear actuator also has a vibration absorbing mechanism for absorbing vibrations caused when the linear actuator operates, and a runaway prevention mechanism for limiting the movable range of the carriage.

5 Claims, 5 Drawing Sheets

LINEAR ACTUATOR ASSEMBLY FOR ACCESSING A MAGNETIC MEMORY DISC

BACKGROUND OF THE INVENTION

This invention relates to a linear actuator assembly and more particularly to a linear actuator assembly capable of speedily positioning an object with a high degree of accuracy. More concretely, this invention relates to a linear actuator assembly for use in a magnetic disk storage apparatus.

It is necessary for recent types of magnetic disk storage apparatus to perform high-speed data recording or reproduction and to perform high-density data recording or reproduction. Accordingly, an actuator assembly for positioning a magnetic head must have a capability for speedily and accurately positioning the magnetic head over a target track on a magnetic disk. To realize such a capability, it is necessary for the actuator assembly to display superior stiffness in the direction of the positioning (direction of the movement of the magnetic head), to transmit the force of a driving force generating means (e.g., a voice coil motor) through a carriage to the magnetic head without experiencing any losses, to have a reduced weight, and to be free from any likelihood of suffering deformation as a result of exposure to heat, and so forth.

However, actuator assemblies which have been provided on the basis of conventional techniques are not able to satisfy the above-described requirements with respect to stiffness, transmission of force, weight and heat deformation. An example of the prior art for linear actuators is disclosed in U.S. Pat. No. 4,144,466, in which a portion through which the force of the voice coil is transmitted to a carriage is constituted by a cylindrical voice coil and a crisscrossed carriage connected to this coil. This means that, when the force is transmitted, bending stress is caused at the connection between the cylindrical and crisscrossed portions such as to generate vibration because of the steep change in cross-sectional area created therebetween. Also, in the arrangement of this patent, the contact area between the cylindrical coil and the crisscrossed carriage is not enough to ensure that heat transfer takes place to an extent sufficient to reduce the temperature of the coil. Thus there is a risk of deformation or damage of the coil.

SUMMARY OF THE INVENTION

It is an object of the present invention to provide a linear actuator assembly capable of speedily positioning an object with a high degree of accuracy.

It is another object of the present invention to provide a linear actuator assembly for use in a magnetic disk storage apparatus capable of speedily positioning a magnetic head with a high degree of accuracy.

It is still another object of the present invention to provide a linear actuator assembly for use in a magnetic storage apparatus which exhibits increased stiffness, is capable of transmitting the force of a driving force generating means to a magnetic head, and is reduced in weight.

It is a further object of the present invention to provide a linear actuator assembly capable of operating while displaying a low level of vibration.

To this end, the present invention provides in one of its aspects a linear actuator assembly wherein a voice coil for generating the driving force of the linear actuator has substantially the same sectional configuration as that of the carriage for supporting a magnetic head.

The present invention provides in another of its aspects a linear actuator assembly having a means for absorbing vibration generated by a drive source.

The present invention provides in still another of its aspects a linear actuator assembly having a runaway prevention means for limiting the movable range of a carriage.

DESCRIPTION OF THE PREFERRED EMBODIMENTS

Figure 1:
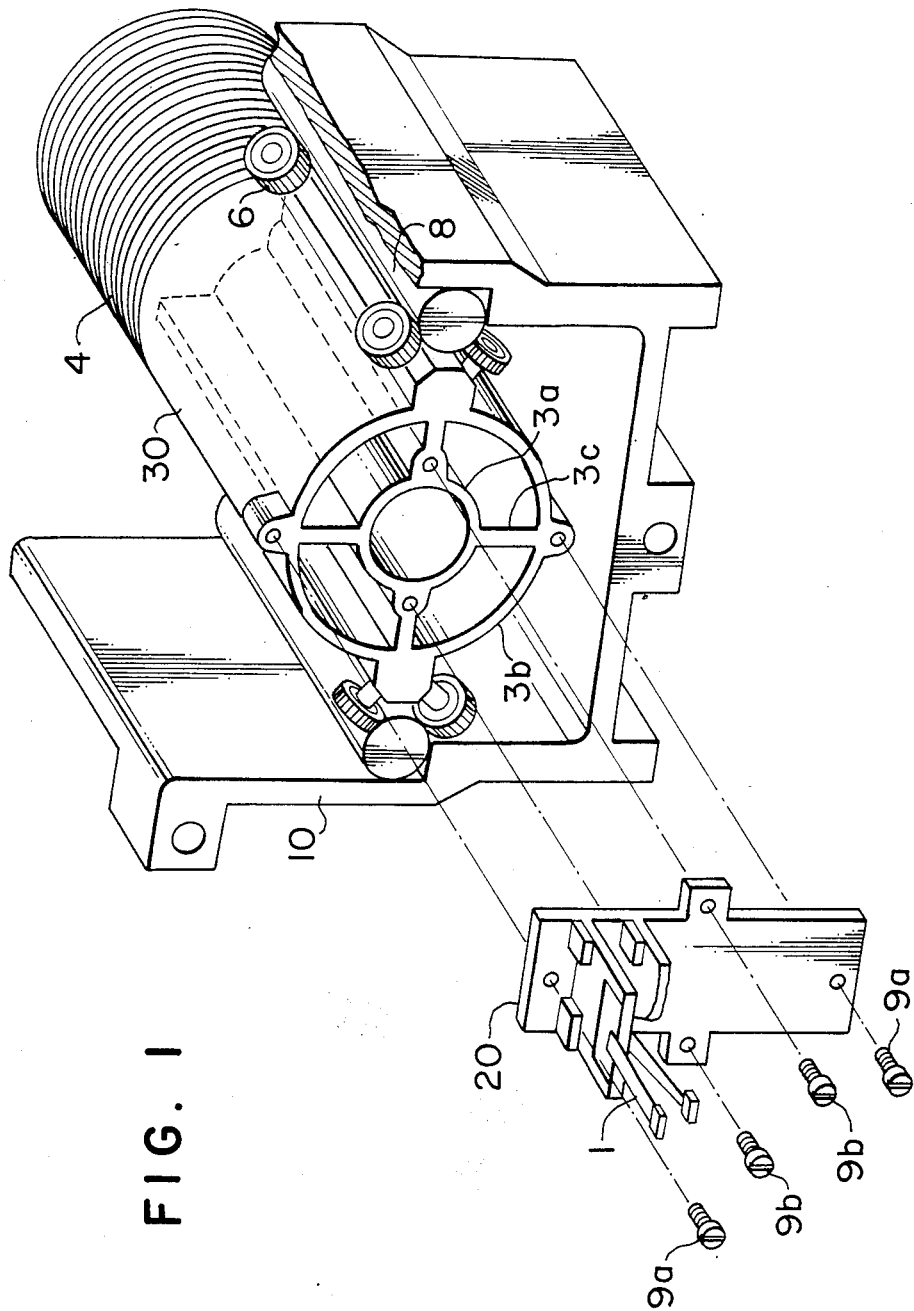
FIG. 1 is a perspective view of a linear actuator assembly which represents an embodiment of the present invention.

The principle of the present invention will first be described before giving a description of the embodiments of the present invention.

In general, a linear actuator includes a load arm for supporting a magnetic head, a voice coil motor having magnets and a coil and adapted for generating driving power, and a carriage which is connected at its one end to the load arm and connected at the other end to the coil of the voice coil motor and which is movable linearly. In this arrangement, the transfer characteristics of the carriage in transferring the driving force represent a problem.

In an ordinary linear actuator, the driving force is transferred in accordance with the following wave equation similarly to propagation of sound:

$$\frac{d^2 u}{dt^2} = \frac{E}{\rho} \frac{d^2 u}{dx^2} \quad (1)$$

where x represents the position coordinate set within the carriage in the direction of positioning; u, the elastic displacement at an arbitrary point x within the carriage; t the time; E, the elastic modulus of the carriage material; and $\rho$, the density of the same. By solving the equation (1), the elastic displacement u at point x:

$$u = \sum_{n=1}^{\infty} A_n \cos \frac{n\pi}{l} \cdot x \cos \frac{n\pi a}{l} t \quad (2)$$

is deduced, where l is the entire length of the carriage. As is clear from the equation (2), the elastic coefficient of the carriage includes the resonance frequency:

$$f = \frac{na}{2l} \quad (3)$$

where a represents the sound speed within the carriage:

$$a = \sqrt{\frac{E}{\rho}} \quad (4)$$

In the magnetic disk storage apparatus, the driving force is controlled in the manner of feedback control to give the magnetic head a superior response characteristic. Therefore, the driving force is expressed as a complicated function of time. This function includes higher harmonic components in relation to time so that, when the resonance frequency represented by the equation (2) corresponds to the frequency of a higher harmonic component of the driving force, the carriage is resonated elasticically to this force and this reduces the positioning accuracy. For this reason, it is preferable to increase the resonance frequency of the carriage represented by the equation (3) as much as possible.

From the equations (3) and (4), the resonance frequency:

$$f = \frac{n}{2l} \sqrt{\frac{E}{\rho}} \quad (5)$$

is found, these calculations being effective only when the cross section of the carriage is maintained constant. Generally, an equation:

$$f = \frac{n}{2} \sqrt{\frac{k}{m}} \quad (6)$$

is employed, where k represents the equivalent spring constant and m represents the mass of the carriage.

As is clear from this equation (6), this equivalent spring constant k is an important factor in relation to the positioning the head with high accuracy, since the resonance frequency f is increased as the equivalent spring constant k of the carriage is increased. The condition which maximizes the spring constant k is one in which the cross section of the carriage is constant and the force is transmitted only by the internal tensile and compressive stress of the carriage. However, it is difficult to make the cross section constant since in practice the shapes of the driving means and the magnetic head support are different from each other. In other words, the role of the carriage is to serve as an intermedium of the force between the driving means and the magnetic head support, which are different from each other in sectional configuration, and to transmit the power generated by the driving means to the magnetic head in a simple manner. For this reason, it is preferable to provide a transmission path for the force with the carriage which has a simple and smooth form.

The transmission path for the force transmitted through the carriage will be described below with reference to FIG. 5, which shows an example of the linear actuator assembly having load arms 1 for supporting magnetic heads, a supporting block 2 for supporting the load arms 1, an L-shaped carriage 3, and a voice coil motor 5 which is composed of a cylindrical coil 4 mounted at the rear end of the carriage 3, a magnet 52 in the form of a tube disposed around and spaced apart from the coil 4, and a yoke encircling the magnet 52 to form a magnetic circuit.

Figure 5:
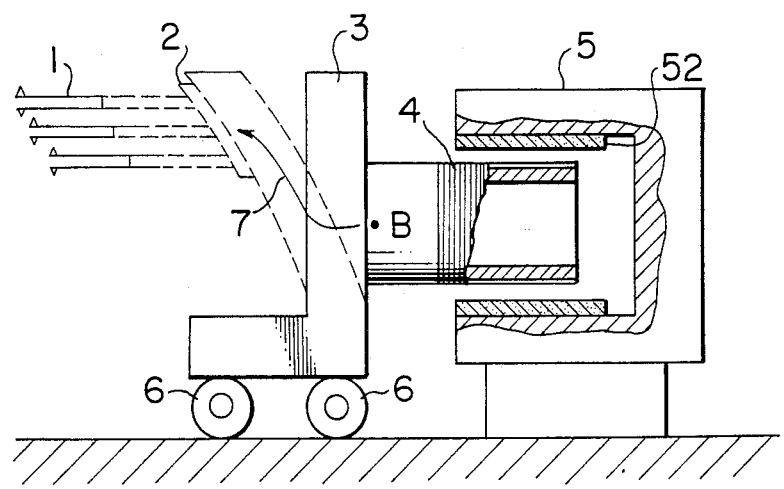
FIG. 5 is an illustration of the principle of a conventional type of linear actuator assembly.

If, as shown in FIG. 5, the support block 2 for the magnetic heads is disposed at a point positioned above a point B on the L-shaped carriage 3 to which the driving force of the voice coil motor 5 is applied, the transmission path of the driving force applied to the point B includes a bending force which acts to bend the carriage 3 as indicated by the broken line 7. Therefore, in the carriage 3 shown in FIG. 5, the transmission path for the force is not smooth, so the magnetic heads tend to be misaligned or vibrated.

Figure 6:
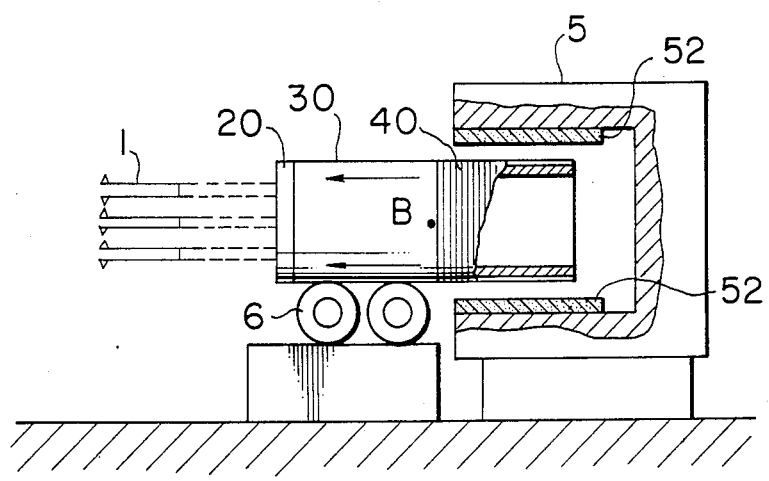
FIG. 6 is an illustration of the principle of the linear actuator in accordance with the present invention.

On the other hand, if, in a linear actuator such that as shown in FIG. 6, a carriage 30 had substantially the same diameter as that of a coil 40 and if a support block 20 is disposed at the center of the carriage 30, the driving force of the voice coil motor 5 is directly applied from the point B on the carriage to the load arms 1 through a simple transmission path. In this arrangement, the transmission path is preferably formed such that the driving force is transmitted through the carriage mainly by the tensile and compressive force caused therein.

Therefore, it is preferable to have the sectional configurations of the carriage 30 and the support block 20 conform with the (cylindrical) sectional configuration of the voice coil 4. However, since the support block 20 must support a plurality of aligned load arms 1, it is difficult to adopt the above-described cylindrical shape for the support block 20. Also, it is necessary to increase the contact area of the end portion of the carriage 30 over which the carriage contacts the support block 20, and to increase the stiffness of this end portion.

In consideration of these requirements, the inventors have invented a linear actuator assembly in which the carriage is provided in the form of a double skinned tube and in which the base portion of the support is in the form of a rectangular plate which contacts this double skinned tube. By virtue of the construction of this double skinned tube, the rectangular support contacts the carriage at its central portion and at its upper and lower ends so that the driving force can be transmitted with high efficiency.

Also, this construction maximizes the contact area between the driving coil and the carriage so that the heat generated from the driving coil is rapidly transferred to the carriage. Furthermore, the heat radiating area is thereby increased to an extent large enough to prevent any damage or deformation of the carriage which might be caused by this heat.

An embodiment of the present invention will be described in detail with reference to FIGS. 1 to 3. In a linear actuator assembly, a carriage 30 has, as shown in FIG. 1, a first thin tube 3b and a second tube 3a the diameter of which is about a half of that of the first tube 3b. The first and second tubes 3b and 3a are concentrical with each other. One end of the tube 3b is connected to a driving voice coil 4 over its entire surface, and the tubes 3b and 3a are connected to each other over the entire length of the carriage 30 by four thin ribs 3c. The carriage 30 is thus composed on these portions. The carriage 30 is integrally formed from aluminum by extrusion. Eight bearings or guiding means 6 are disposed on opposite sides of the carriage 30 so that the carriage 30 is supported and guided along guide rails 8. A support block 20, to which load arms 1 supporting magnetic heads are fixed and secured, is fastened to the other end of the carriage 30 at four points by means of fastening bolts 9a and 9b. The bolts 9a are employed to fasten the support block 20 to the first tube 3b of the carriage 30, and the bolts 9b are employed to fasten the support block 2 to the second tube 3a of the carriage 30.

Figure 2:
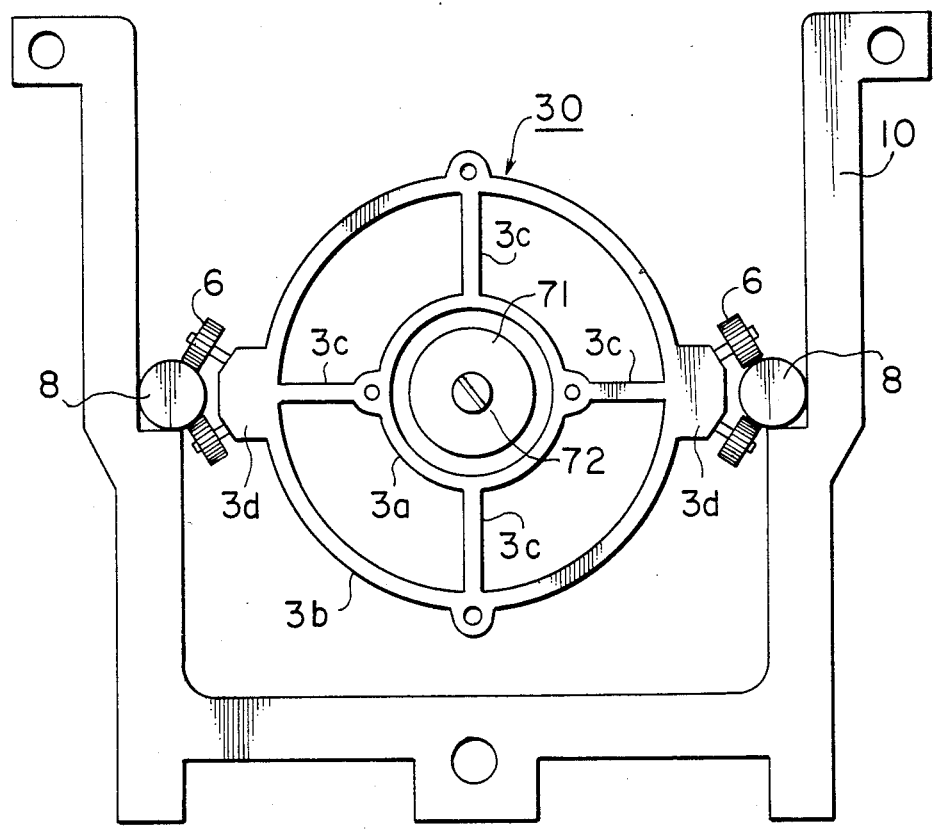
FIG. 2 is a front view of the linear actuator shown in FIG. 1.

FIG. 2 shows a front view of the carriage viewed from the magnetic heads. As is clear from FIG. 2, the carriage 30 of this embodiment has left and right projections 3d, and is arranged such that the plurality of bearings 6 disposed on the projections 3d pinch the guide rails 8. Accordingly, the carriage 30 is symmetrical about the vertical and horizontal axes, as viewed in FIG. 2, so that the driving force which is generated by the voice coil 4 connected to the rear end of the carriage 30 is linearly transmitted along the center axis of the carriage 30. The carriage 30 is thus linearly movable in the direction perpendicular to the picture plane of FIG. 2.

Figure 3:
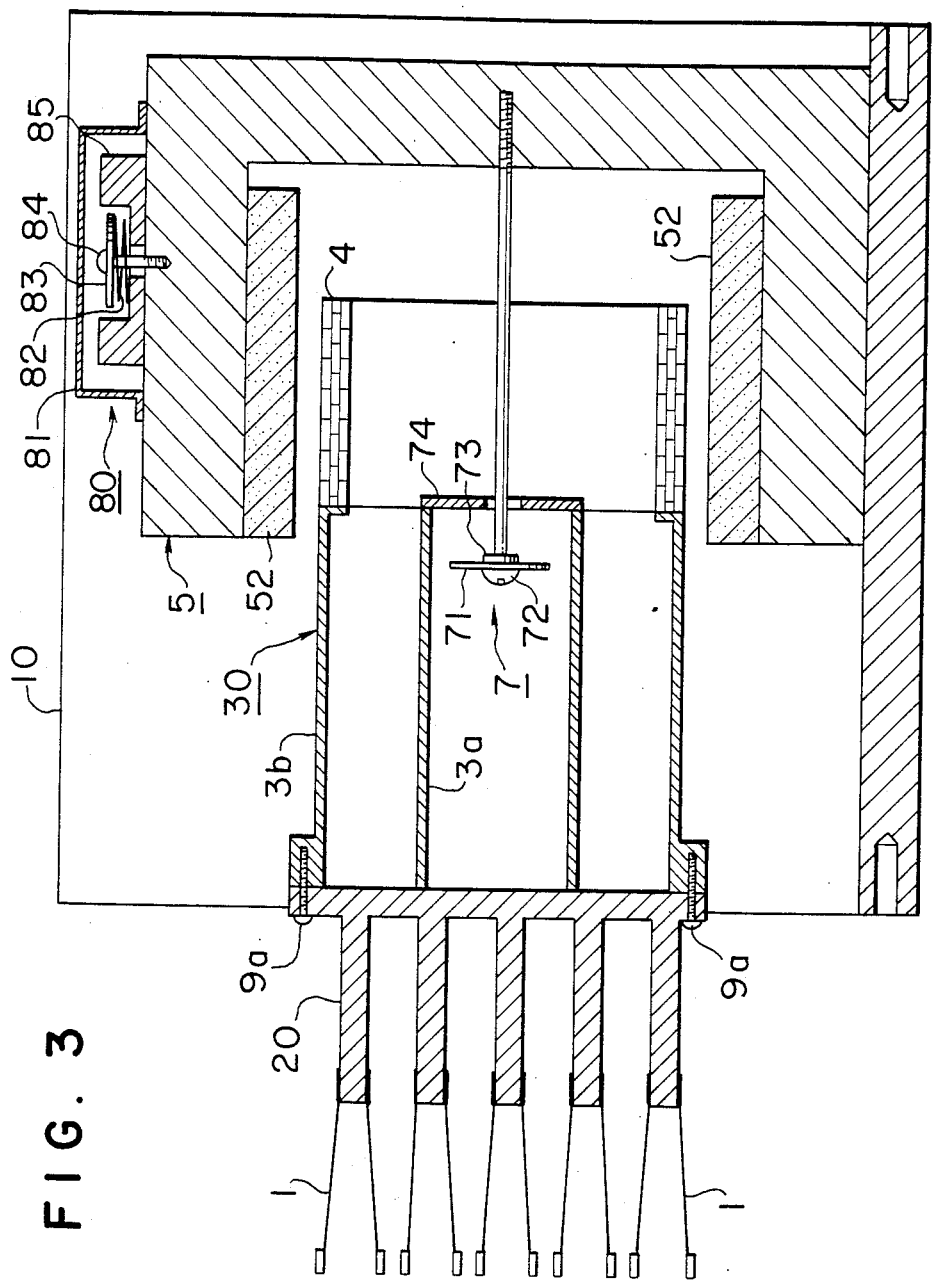
FIG. 3 is a longitudinal sectional view of the linear actuator shown in FIG. 1.

FIG. 3 shows in section the actuator assembly of FIG. 1 when the same is viewed in the transverse direction and specifically shows a voice coil motor 5 which is not depicted in FIG. 1.

The voice coil motor 5 includes a magnet 52 in the form of a tube and the voice coil 4 inserted into this magnet 52 and bonded to the rear end of the carriage 30. When an electric current flows through this coil 4, the carriage 30 moves left or right as viewed in FIG. 3. The voice coil motor 5 also includes a runaway prevention mechanism 7 and a vibration absorption mechanism 80. The runaway prevention mechanism 7 consists of a thread stud 72 coaxial with the center axis of the voice coil motor 5, a disk plate 71 secured to the head of the thread stud 72 by means of a nut 73, and a disk plate 74 which is fastened by screws to the rear end portion of the carriage 30 and which has a central hole large enough to permit the thread stud 72 to pass therethrough but small enough to prevent the disk plate 71 from passing therethrough. This runaway prevention mechanism functions such that, when the carriage 30 is going to overrun in the leftward direction as viewed in FIG. 3, the disk plate 71 hits the disk plate 74, thereby preventing the carriage 33 from further moving leftward from the position in which the disk plate 71 contacts the disk plate 74. Thus, the runaway prevention mechanism 7 eliminates the risk of the magnetic heads or disks being damaged.

The vibration absorption mechanism 80 is disposed at the top of the voice coil motor 5 to absorb vibrations caused by the driving operation of the voice coil 4. The vibration absorption mechanism 8 is composed of a screw 84, disk plate 83 which are attached to the screw 84 and a spring 82, a damping mass 85 elastically pressed against the voice coil motor 5 by the spring 82, and a cover 81 for covering the damping mass 85, etc. When vibrations are caused by the voice coil motor 5, the damping mass 85 which is pressed against the motor 5 by the spring 82 moves with frictional force acting between the damping mass and the top of the motor 5, thereby absorbing the vibrations. The cover 81 is adapted for preventing very fine dust caused by the rubbing between the damping mass 85 and the motor 5 from being dispersed to the magnetic disks. By the effect of the provision of the vibration prevention mechanism 80, it is possible for the actuator assembly in accordance with the present invention to position the magnetic heads with a high degree of accuracy.

As described above, in the actuator assembly in accordance with the present invention, the positioning driving force generated from the voice coil 4 is transmitted first, in the form of tensile and compressive force, to the first tube 30 which is in the same form as that of the voice coil 4. This force gradually spreads by way of the thin ribs 3c while being transmitted from one end of the carriage to the other end, and is then transmitted to the second tube 3a. Accordingly, the driving force is uniformly distributed over the entire section of the transmission path at the end surfaces where the carriage 30 and the support 20 are connected to each other so that the driving force acts to uniformly push or pull the rear side of the support 20. All of the members which constitute the actuator assembly do not transmit any force other than the compressive and tensile force, thereby increasing the mechanical resonance frequency of the actuator assembly.

In this embodiment, the carriage 30 has the tubular construction, and the contact area between the voice coil 4 and the carriage 30 is maximized so that the heat is transferred to the carriage 30 with an increased heat conductivity. Furthermore, the carriage 30 is composed of the double skinned tube and the plurality of ribs so that the heat radiating area of the carriage 30 is large enough to rapidly absorb the heat generated by the voice coil 4 and to radiate the same to the surrounding air. The present invention employs an aluminum product formed by extrusion to construct the carriage 30, thereby enabling the actuator to be produced at an improved efficiency and to be greatly reduced in weight by reducing the thickness thereof to less than 1 mm.

Figure 4:
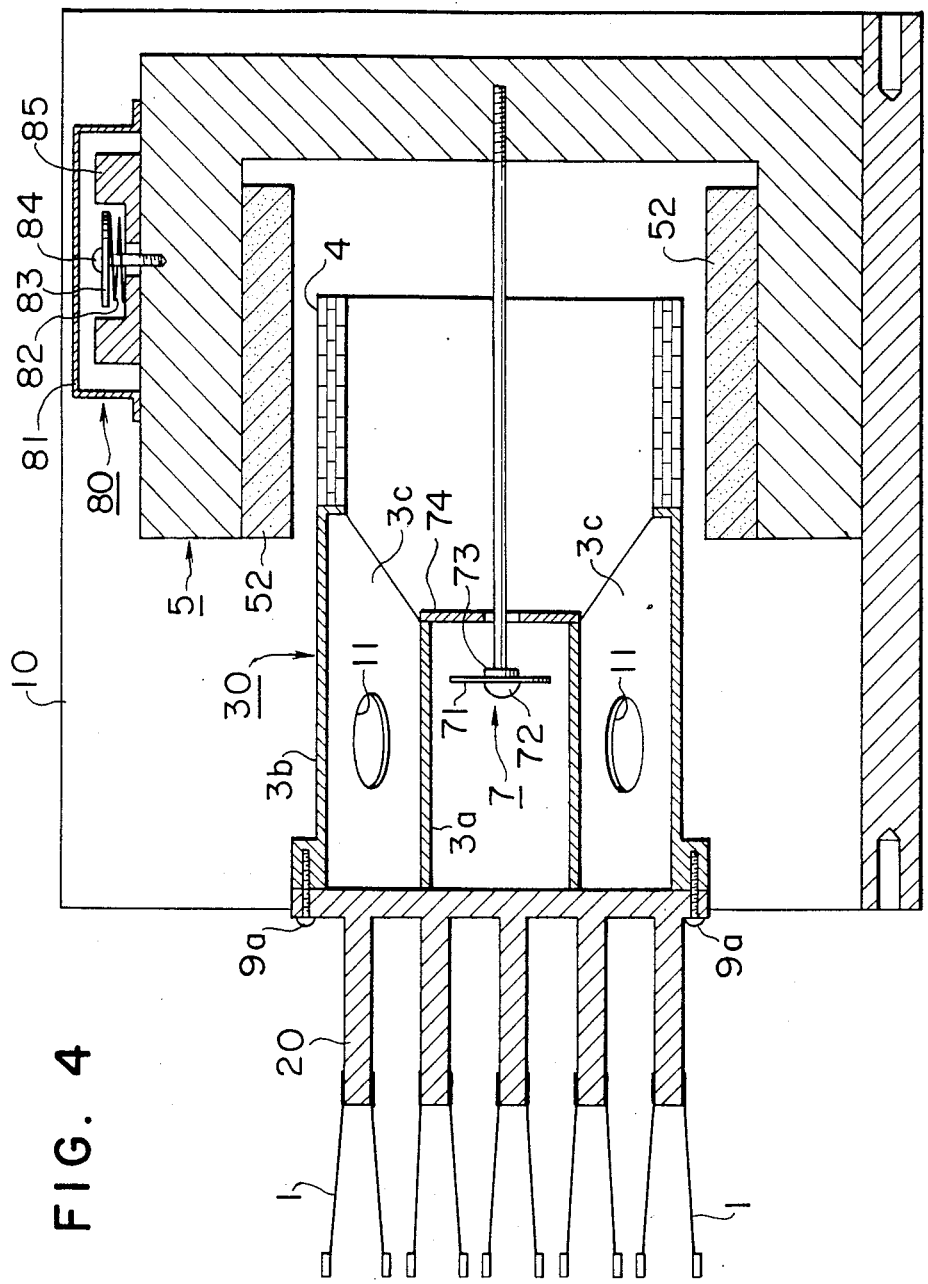
FIG. 4 is an illustration of another embodiment of the present invention.

It is preferable to form the ribs 3c over the entire length of the carriage, but it is possible to otherwise arrange such that the rear end of the actuator 30 is recessed in the direction of the magnetic heads and that lightening holes 11 or the like are provided in the ribs 3c within the limit of suitably maintaining the transmission path for the driving force. Other constituent members in the arrangement shown in FIG. 4 are the same as those in the arrangement shown in FIG. 3, and, therefore, the description for them will not be repeated.

According to the present invention, the driving force of the actuator can be transmitted to the magnetic heads without any loss due to bending or torsion of the members, thereby enabling the magnetic heads to be accurately positioned. Also, the linear actuator in accordance with the present invention is improved in terms of the heat conductivity and is reduced in weight so that the positioning process can be easily effected at a high speed. Thus it is possible to provide an accurate and high-speed linear actuator for a magnetic disk storage apparatus.

What is claimed is:

1. A linear actuator assembly mounting at least one magnetic head for accessing a magnetic memory disc, comprising:
   a head support block for supporting said at least one magnetic head;
   a carriage for mounting said head support block at one end of said carriage;
   guide means for supporting and linearly guiding said carriage; and
   driving means for linearly moving said carriage along said guide means in opposite directions, said driving means including a voice coil mounted on said carriage at another end of said carriage and a stationary tubular magnet secured to a stationary yoke and arranged around said voice coil for applying a magnetic flux to said voice coil;
   said carriage including a first tubular portion and a second tubular portion said second tubular portion having a cross-section similar in shape and smaller in size than that of said first tubular portion and being concentrically connected with said first tubular portion through radially extending ribs, said first tubular portion having two oppositely extending integral projections at the outer surface thereof at positions opposite two of said radially extending ribs said voice coil having a cross-section substantially equivalent in shape and size to that of said first tubular portion; and said head support block being fastened to both said first and second tubular portions.

2. A linear actuator assembly according to claim 1, wherein said cross-sections of said first and second tubular portions and said voice coil are circular.

3. A linear actuator assembly according to claim 1, further comprising vibration absorbing means connected with said stationary yoke, said vibration absorbing means including a damping mass pressed on said yoke by an elastic force and a cover for covering said damping mass in a sealing manner.

4. A linear actuator assembly according to claim 1, wherein said two oppositely extending integral projections at the outer surface of said first tubular portion form part of said guide means for supporting and linearly guiding said carriage, said magnetic memory disc lying in a plane, and said guide means including said two oppositely extending projections having a guide plane including the longitudinal central axis of said carriage and extending in parallel to the plane of said magnetic memory disc.

5. A linear actuator assembly mounting at least one magnetic head for accessing a magnetic memory disc, comprising:

a head support block for supporting said at least one magnetic head;

a carriage for mounting said head support block at one end of said carriage, said carriage having a longitudinal central axis;

guide means for linearly guiding said carriage;

driving means for linearly moving said carriage along said guide means in opposite directions, said driving means including a voice coil mounted on said carriage at another end of said carriage and a stationary tubular magnet secured to a stationary yoke and arranged around said voice coil for applying a magnetic flux to said voice coil; and a runaway prevention mechanism including an abutting member provided in said carriage, a stationary stopping plate for stopping said abutting member, and a rod for mounting said stopping plate at one end thereof, said abutting member, said stopping plate and said rod all being located along the longitudinal central axis of said carriage.

* * * * *